(12) United States Patent
Maier et al.

(10) Patent No.: US 10,511,576 B2
(45) Date of Patent: Dec. 17, 2019

(54) PRIVACY AS A SERVICE BY OFFLOADING USER IDENTIFICATION AND NETWORK PROTECTION TO A THIRD PARTY

(71) Applicant: Microsoft Technology Licensing, LLC, Redmond, WA (US)

(72) Inventors: Christian O Maier, Munich (DE); Khaled Galal Mohamed Rashad, Cairo (EG); Mohamed Alaa Elmiligui, Cairo (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 15/617,529

(22) Filed: Jun. 8, 2017

(65) Prior Publication Data
US 2018/0359223 A1 Dec. 13, 2018

(51) Int. Cl.
*H04L 29/06* (2006.01)
*G06F 21/62* (2013.01)
(Continued)

(52) U.S. Cl.
CPC ...... *H04L 63/0421* (2013.01); *G06F 21/6254* (2013.01); *G06F 21/6263* (2013.01);
(Continued)

(58) Field of Classification Search
CPC .................................................. H04L 63/0421
See application file for complete search history.

(56) References Cited

U.S. PATENT DOCUMENTS 7,200,578 B2 4/2007 Paltenghe et al.
8,843,997 B1 9/2014 Hare
(Continued)

FOREIGN PATENT DOCUMENTS

EP 2980725 A1 2/2016
WO 2016206671 A2 12/2016

OTHER PUBLICATIONS

Claessens, et al., "Revocable anonymous access to the Internet", In Journal of Internet Research vol. 13, No. 4, Oct. 2003, pp. 1-20.
(Continued)

*Primary Examiner* — Simon P Kanaan
(74) *Attorney, Agent, or Firm* — Schwegman Lundberg & Woessner, P.A.

(57) ABSTRACT

A method and apparatus that securely obtains services in response to a request for a service while concealing personally identifiable information (PII) includes a software package having a user identification (ID) and network protection module that runs on a third party system and an anonymizer module that runs on a user system. The user system sends the request for the service via an API that invokes the user ID and network protection module to validate the request. In response to receiving validation, the anonymizer module modifies the request for the service to conceal at least part of the PII and sends the modified request to the service provider. In one embodiment, the third party system may be an application program configured to run on the user system. Thus, no PII or data to identify the unique individual is transmitted to the service provider.

14 Claims, 6 Drawing Sheets

(51) Int. Cl.
H04W 12/12 (2009.01)
H04W 12/02 (2009.01)
(52) U.S. Cl.
CPC ........ *H04L 63/0407* (2013.01); *H04L 63/101* (2013.01); *H04L 63/1441* (2013.01); *H04L 63/1483* (2013.01); *H04W 12/02* (2013.01); *H04W 12/12* (2013.01); *G06F 2221/2115* (2013.01); *H04L 2463/144* (2013.01)

(56) References Cited

U.S. PATENT DOCUMENTS

| | | |
|---|---|---|
| 2003/0080997 A1 | 5/2003 | Fuehren et al. |
| 2010/0325441 A1* | 12/2010 | Laurie .................... G06F 21/31 713/185 |
| 2010/0333178 A1 | 12/2010 | Suthoff |
| 2013/0332987 A1 | 12/2013 | Tenneti et al. |
| 2014/0007179 A1 | 1/2014 | Moore |
| 2015/0149765 A1 | 5/2015 | Pauliac et al. |
| 2016/0283745 A1* | 9/2016 | LaFever .............. G06F 21/6254 |

OTHER PUBLICATIONS

Martin, et al., "Deanonymizing Users of the SafeWeb Anonymizing Service", In Proceedings of the 11th USENIX Security Symposium, Aug. 5, 2002, 16 pages.

"International Search Report Issued in PCT Application No. PCT/US2018/034015", dated Oct. 31, 2018, 11 Pages.

* cited by examiner

PRIVACY AS A SERVICE BY OFFLOADING USER IDENTIFICATION AND NETWORK PROTECTION TO A THIRD PARTY

BACKGROUND

Many applications using web services provide personally identifiable information (PII) to the web services. The web services use this information to ensure that the requester is authorized, to build user profiles to personalize the experience for the user, to detect and stop malicious attacks, such as denial of service, and to reduce the incidence of fraudulent access. Denial of service attacks are often implemented using automated agents, commonly known as bots, such as web robots that may concurrently access a particular web service from many different user devices. In addition to detecting unauthorized users, web services may detect other types of fraudulent access for example, when a user posts content on a web service and the web service agrees to pay the user based on the number of times the content is accessed. The user may employ bots to access the information, thus, inflating the number of accesses. In addition, users may modify the PII that is sent to the web services so that it appears that the requests originate at different client devices. Furthermore, when payment is required, there may be multiple requests from different web addresses that use the same credit card number. Providers of web services monitor the requests to detect these and other types of attacks and improper activity.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An example method and apparatus includes a processor and instructions that configure the processor to receive a request for the service from the user, where the received request includes personally identifiable information (PII). The instructions further configure the processor to send the request and the PII to a third-party client of the service provider and to receive a response from the third-party client. The response includes an indication that the request for the service is authorized. In response to the indication that the request for the service is authorized, the instructions further configure the processor to modify the request for the service by anonymizing the PII and to send the request to the service provider with the anonymized PII to the service provider.

Another example method and apparatus includes a processor of the third-party client and instructions that configure the third-party processor to receive the request and the PII, to analyze the request and the PII for indicators that the request was sent by a web robot (bot) and/or that the request may be fraudulent. When no such indicators are found, the instructions configure the third party provider send a response indicating that the request is authorized, to modify the request by applying a hash function to the PII and to store the modified request for the service.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description when considered in conjunction with the drawings.

DETAILED DESCRIPTION

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor." may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

As cloud services have developed, users are increasingly accessing web services and web content using application program interfaces (APIs) or other software packages that provide an easy to use interface between the user's computer and the service providers. To personalize the experience for a given requester, to reduce fraudulent accesses and to reduce the incidence of bot attacks on the web service, these APIs typically send personally identifiable information (PII) for the end-user to the web service along with the request for the service. The service provider then processes the PII to ensure that the user is authorized, personalize the experience for the user and to detect bot attacks and/or fraud. PII may include, without limitation, information such as the user's full IP address, the full user agent (UA) string, cookies retrieved from the user's computer, a machine unique ID (MUID) identifying the user's system and/or a session ID. Although the examples described below use a search request as a web service request, it is contemplated that the examples may apply to other types of web services, such as, without limitation, an artificial intelligence system, a crowd-source system, or a social networking system.

Although the service providers use the PII to detect bots and fraud, users of the service may not want to send the PII to protect against the service provider collecting the PII and building a profile for the user. In addition, the service providers may want to offload the fraud/attack checking to reduce their per-request processing burden and, thus, to allow users to access the service without providing PII.

The following describes example apparatus and methods for an API or other software package to receive and process a request for a web service by sending the request and the PII to a third party provider. The third party provider, who may be in a contractual arrangement with the service provider but may not be otherwise affiliated with the web service provider, processes the request for the service and the PII to detect possible bot activity and/or fraudulent activity and, optionally, to analyze the PII to determine whether the user is an authorized user and to keep the PII, without exposing to the service provider. When no bot activity or fraudulent activity is detected and the user is determined to be authorized, the user system anonymizes the PII and sends the request for the service with the anonymized PII to the service provider via the user's network interface. Although the examples described below concern embodiments employing APIs, it is contemplated that other software packages such as software libraries or object files may be used in place of or in addition to the APIs.

To detect bot activity and fraud, the third-party provider may analyze the request and other contemporaneous and historical requests for patterns indicative of bot activity. Such patterns may include, for example, multiple similar requests for the service occurring in a short period of time from a single user, or from multiple disparate users. Bot activity may also indicate fraud, for example, when the bots access content linked to advertisements or access other content where the service provider makes payment to the content owner based on the number of accesses.

The third-party provider may also detect other types of fraudulent access, for example, by monitoring contemporaneous credit card purchases or comparing the PII to a blacklist of known fraudulent requesters. Based on a history with particular requesting users, the third-party provider may also generate a white list that allows white-listed users access to the web service with reduced testing.

When the third-party provider determines that a user may access the web service, the third-party provider may notify the user who may then anonymize the PII, for example, by zeroing out portions of user's IP address and/or by truncating or editing the user agent (UA) string that is generated by the API or other software package to be sent to the service provider with the request for the service.

In some examples, the API provided by the service provider may include multiple software packages e.g. dynamic link library (DLL) programs) that run in different environments. For example the API may include an anonymizer that runs on the user system and a bot/fraud detection system that runs as a part of the third-party software either as a separate application (APP) on the user system or on the third-party system. The service provider may provide the respective portions of the API to the user system and to the third-party system under a contractual arrangement which ensures that the service provider does not have access to the non-anonymized PII.

Figure 1:
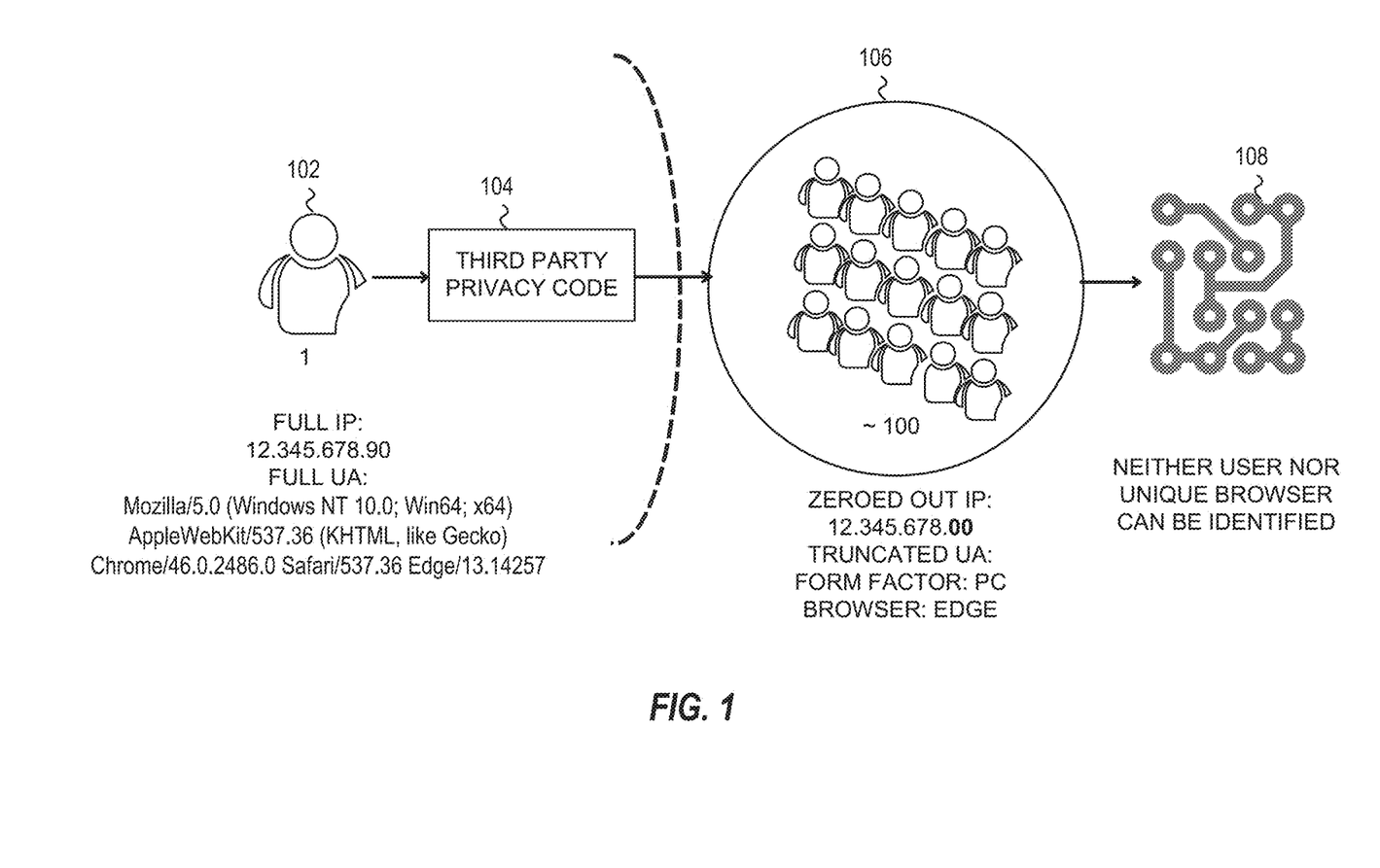
FIG. 1 is a functional block diagram illustrating an example system.

FIG. 1 is a high-level block diagram that illustrates the basic functioning of the embodiments described below. A user system 102 requests a web service and sends PII with the web service request. In this example the PII includes a full IP address (e.g. 12.345.678.90) and a full user agent string (e.g. "Mozilla/5.0 (Windows NT 10.0; Win64; x64) AppleWebKit/537.36 (KHTML, like Gecko) Chrome/46.0.2486.0 Safari/537.36 Edge/13.14257"). The request for the web service and the PII are processed on the client 104 (e.g. an app or a third-party webservice). As described in the examples below, the third-party client 104 may analyze the service request and PII against previous service requests and may apply a modified version of the request to a neural network, and/or apply rules or heuristics that have been developed over time to detect bot or fraudulent requests. If the third-party client 104 determines that the request is not likely fraudulent and not likely from a bot, the third-party signals the user portion of the API to anonymize the PII, and pass the anonymized request to the service provider 108.

Because the request is anonymized, the service provider 108 cannot build a profile of the user and, thus, cannot return personalized results.

In one example, as shown in block 106, the PII may be anonymized by zeroing out the last two octets of the IP address and by truncating the UA string so that it only indicates that the request came from a PC using the Microsoft® Edge® browser. This anonymized data cannot be resolved to a single user software or device. Instead, as shown in block 106, the anonymized data identifies approximately 100 users. Because only the last two octets are zeroed out, the IP address may still provide information about the geographical location of the user which may be used to identify an edge server for handling a user's request. The type of browser and the form factor of the user's computer may be used by the service provider to format the requested data for presentation on the user system 102, but not to personalize the response to the user.

Figure 2:
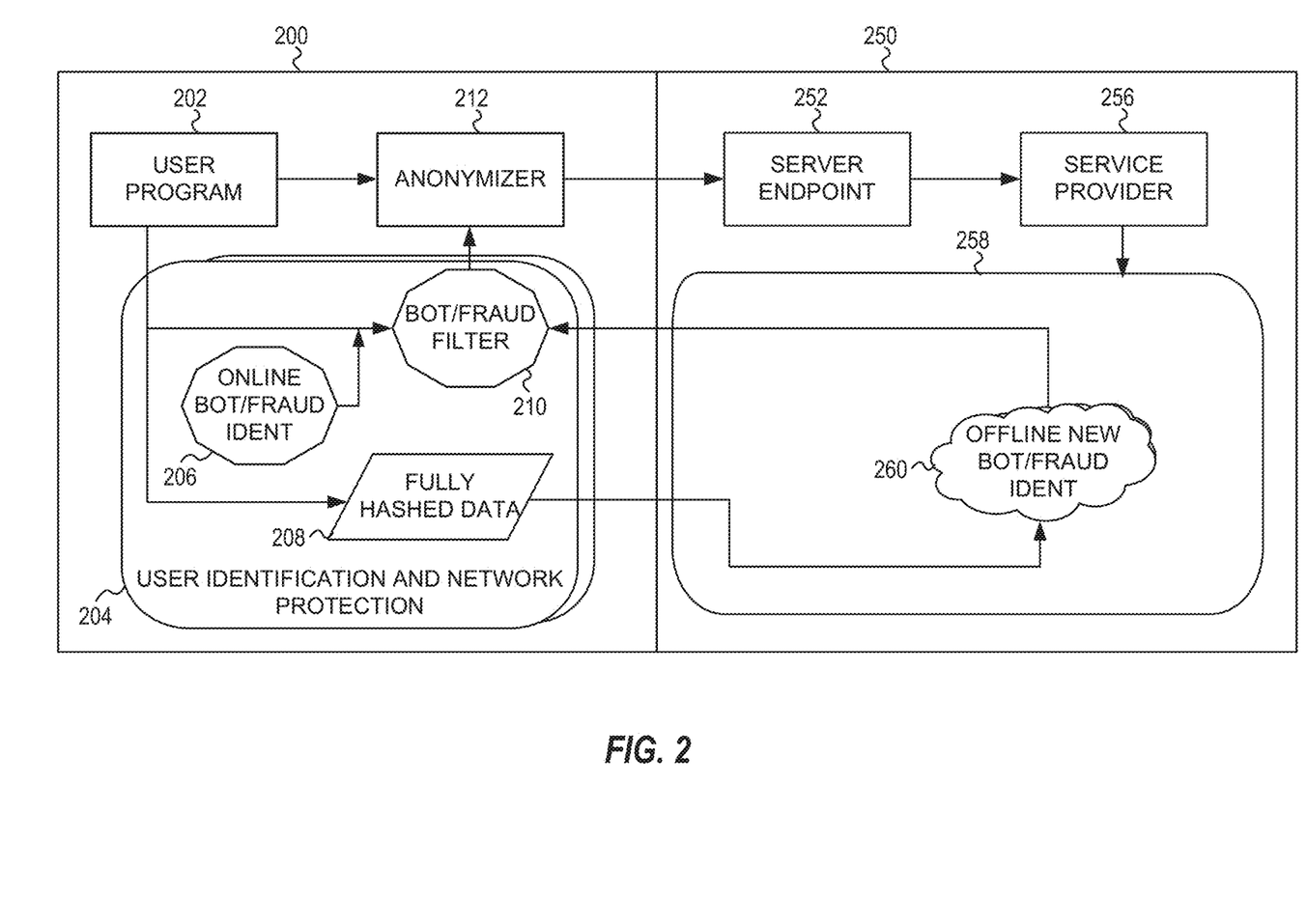
FIG. 2 is a block diagram showing an example partitioning of tasks for an example system.

FIG. 2 is a block diagram of an example embodiment including a third-party user identification and network protection system. Block 200 represents the user's system (e.g. computer, mobile device, a tablet, etc.). Block 250 represents components that run on the user's device. As shown in FIG. 2. A user program 202 generates a request for a service which is provided to, and anonymized by block 212. The request for the service is also processed on the user identification and network protection block 204 of the client (e.g. the third-party). Although block 204 is shown as located on the user's device, it is contemplated that it may be hosted by a separate third-party system (e.g. a website). When implemented on the user's system 200, the user identification and network protection block may be an application program (APP) that is part of the API provided by the service provider either directly or through the third-party. Such an API, for example, may be invoked from the user program 202 such as a web browser running on the user's system 200.

As described above, the request for the service may be made through an interface such as an application program interface (API). The API may have several components, including the anonymizer block 212, the user identification and network protection block 204, and an indication of a server endpoint 252 that provides the interface between the user program 202 and the service provider 256. Each block may be a software package (e.g. a function library such as a DLL, OCX, DRV or DPL) that may be invoked from the API. As shown in FIG. 2, the components of the API may exist on different systems. For example the anonymizer block 212 may be a component of the API running on the user's system 200. The user identification and network protection block 204 may be in a third-party APP running on the user's device or on a third-party server.

In addition the example system may employ other components that run on the client (e.g. third-party server), such as an off-line bot/fraud identification system 260. The system 260 analyzes data provided by the user identification and network protection system and by other similar systems (not shown) to help identify fraudulent requests and requests made by bots. The system 260 may, for example, include a machine-learning algorithm that analyzes previous requests for service from the service provider 256 and requests for services from the other service providers to identify similarities and patterns indicative of bot activity or fraudulent activity. Once identified, the machine-learning algorithm may convert these patterns into rules-based heuristics that can be used by the user identification and network protection block 204 to detect fraudulent or bot activity. Because a particular request may not be identified as a bot request or fraudulent when it is first received, the system 260 may store requests processed by the user ID and network protection system 204 so that when a subsequent request indicates that the initial request was part of a set of fraudulent or bot requests, the system 260 can generate rules to detect the unauthorized activity earlier in the process.

The system 204 may also include an on-line bot/fraud identification (ID) system 206 that may include one or more neural networks or rules engines which are trained using transaction sequences known to be bot transactions and/or transactions known to be fraudulent. In one embodiment, the offline new bot/fraud identification system processes anonymized requests to build training data for the neural networks and/or rules engines of the online bot/fraud identification system 206. The on-line system may analyze the request received from the user application in conjunction with other contemporaneous requests to detect bot transactions or transactions that are likely to be fraudulent.

As described above, the service provider 256 generates the bot/fraud ID system 206 and the new off-line bot/fraud identification system 260 provides them to the third-party system. An example system 206 performs all of the user ID and security checks that are currently performed by the service provide in response to receiving a request for a service.

While the online bot/fraud identification system 206 and the off-line new bot/fraud identification system 260 may detect many fraudulent transactions or transactions by bots, some suspect transactions may not be identified and may be sent to the service provider 256. When the service provider 256 identifies such transactions as fraudulent or bot transactions, the provider 256 may signal the third-party to add the transaction to a training set for the neural network or rules engine of the online bot/fraud identification system 206 and/or may send information on the transaction to the third-party for the generation of a rule or heuristic by the off-line new bot/fraud identification system 260.

The systems 206 and 260 do not store the users PII. Instead, at block 208, the user ID and network protection block 204 applies a one-way hash function to the PII provided by the user program 202 before providing the request to the off-line new bot and fraud identification system 260. Block 208 may also extract some of the PII from the request, for example the machine unique identifier (MUID) and cookies left on the user system 200 by prior interaction with the service provider. The filter 210 may also analyze the request for suspicious locations, User Agents, IP addresses, request/click behaviors and/or any other signals that might identify a bot or fraudulent request. For example, the filter 201 may compare the request to a blacklist of locations/User Agents/IP addresses. This information may be provided to the on-line bot/fraud identification system 206 for use in identifying fraudulent requests and/or requests originating from bots. The hashed data generated by block 208 uniquely identifies the request but obscures any PII so that no PII is stored by the offline system 260. The use of the hash function allows repeated attempts by a malicious user to be detected even when no PII is stored. The user ID and network protection block 204 and the online bot/fraud ID system 206 may store some PII (e.g. IP address, and/or MUID) if it is determined to be associated with a bot or with a fraudulent request.

The third party provider may analyze all of the PII to determine whether a particular user is authorized. For example, the PII may include data identifying a particular user, such as a user ID, MUID, the combination of User Agent, IP and location or others. When the request is identified as a bot or as fraudulent, the third party provider may flag the request as being unauthorized or fraudulent.

As shown in FIG. 2, the system may employ multiple user identification and network protection blocks 204 as well as multiple off-line new bot and fraud identification blocks 260. These systems may be maintained by the same or different third-parties and the service provider may contract separately with each of the different third-parties. The different third parties may provide the same services in parallel or may provide different services based on the content of the request. Different third parties may also be used by the service provider in different geographic regions.

In operation, the user program 202 generates a request for a service (e.g. a search request for an Internet search engine) for example, by accessing an API. The API passes the request to the user ID and network software protection block 204 and to the anonymizer block 212, which, as described above may be components of the API even though they run in different environments. The block 204, using the filter 210 tests the request against online data identifying bot and fraud activity using block 206 and compares the request to off-line bot/fraud identifying data from block 260. Blocks 206 and 260 may include rules engines, databases, expert systems, neural networks, etc. that analyze requests for service from the service provider 256 to identify transactions that are likely to be fraudulent and that are likely to have been initiated by a bot.

When the bot/fraud filter 210 determines that the request is not likely to be fraudulent or not likely to have been initiated by a bot, block 204 provides an authorization result to the anonymizer block 212 on the user's system 200. In response to the authorization code, the anonymizer block 212 modifies the request to delete at least some of the information that may be used to identify the user. This information may be modified, as described above, so that a particular user, software or app (e.g. a browser) cannot be identified but the service provider may still obtain information used to provide the response to the request, such as the general geographic location of the user and the particular system type and software used to generate the request.

The modified request with the authorization result is then used to access the requested service. As shown in FIG. 2, the service may be accessed via a server endpoint 252, for example, an edge server of a network used by the service provider 256. The server endpoint 252 may be a server that is physically located proximate to the user device and that has access to the requested service, for example, an Internet search engine. The server endpoint may be identified, for example, during the domain name service (DNS) lookup operation for the destination Internet address identified in the request.

Figures 3A, 3B:
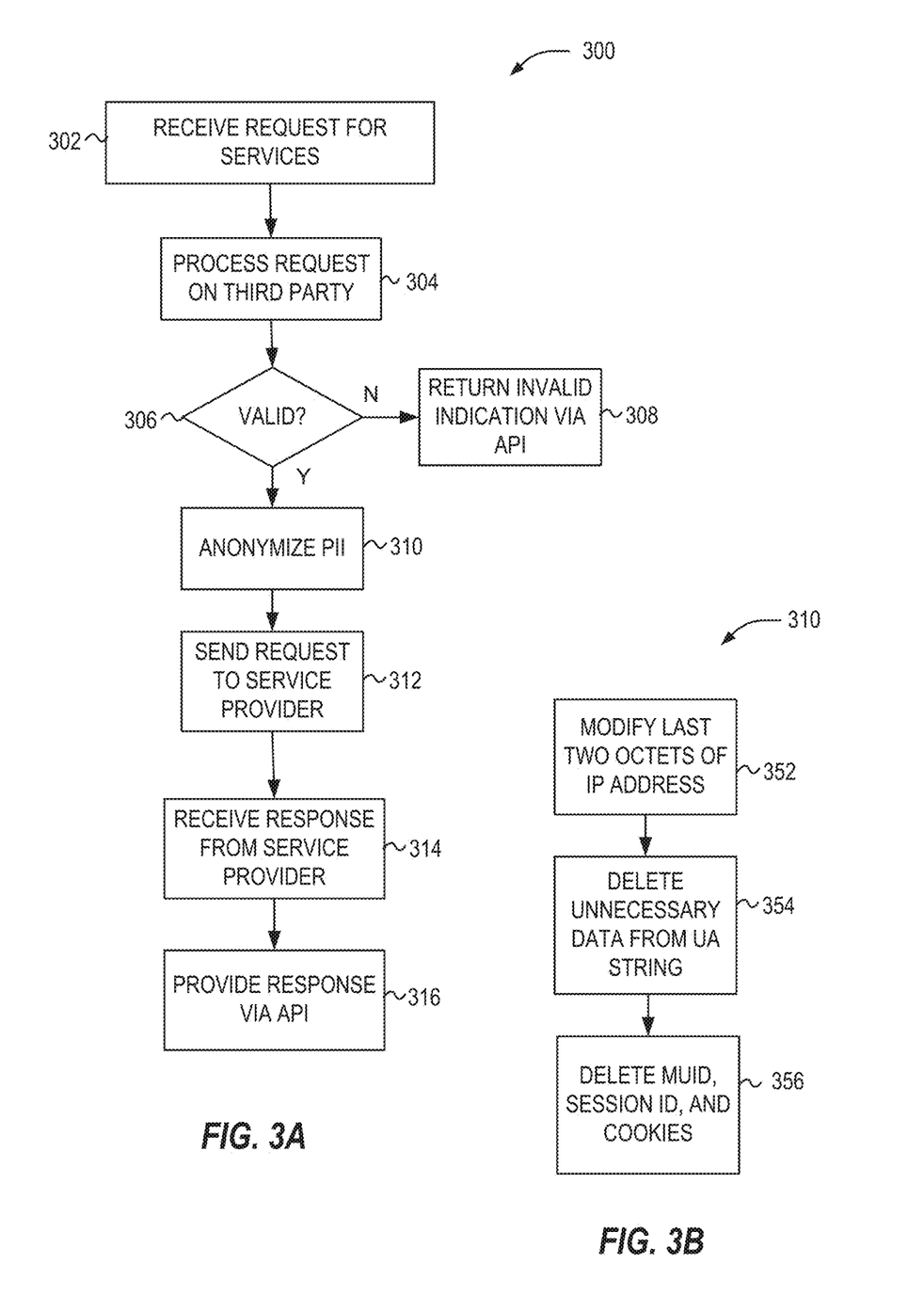
FIGS. 3A and 3B are flow-chart diagrams of an example user portion of an application programming interface (API)

FIGS. 3A and 3B are flowchart diagrams of a program 300 which is a portion of the API that is configured to run on the user system 200. At block 302 the program receives the API invocation including web-service request and the PII. At block 304 the program sends the request, with the PII, to the third-party user ID and network protection system 204. The third-party system 204 processes the request and returns the authorization result indicating whether the request is valid or is invalid as a bot or fraudulent request to block 306. When block 306 indicates an invalid request, the program 300 returns an invalid indication to the user via the API.

When block 306 indicates a valid request, block 310 anonymizes the PII and, at block 312 sends the request to the service provider. At block 314 program 300 receives the response from the service provider and forwards it to the user via the API.

FIG. 3B is a block diagram of an example anonymizer 310 that may be used in the program 300. At block 352, the anonymizer replaces for example the last two octets of the IP address transmitted with the request by zeros or other values. As described above, this block reduces the ability of the IP address to identify a specific user, software or app as the modified IP address may correspond to multiple users, software or apps. The next block, 354, deletes unnecessary data from the user agent (UA) string. The UA string contains information about the user system 200. UA strings are commonly inserted by Internet browsers to provide the service provider with information that may be used to format the response for proper display on the user system. An example UA string may include a user agent identity, the type of program generating the request, the operating system, and the software vendor ID. In one embodiment, the UA string may be edited by removing all information except the identity of the browser used to make the request and an indication of the type of the user system (mobile device, personal computer, etc.).

The PII may also include other information such as the machine unique identifier (MUID) which identifies the user system 200, a session ID for the session established with the server endpoint 252, and cookies that may have been left on the user system 200 related to services previously provided by the service provider 256. The example anonymizer 310 removes these items from the PII.

Figure 4:
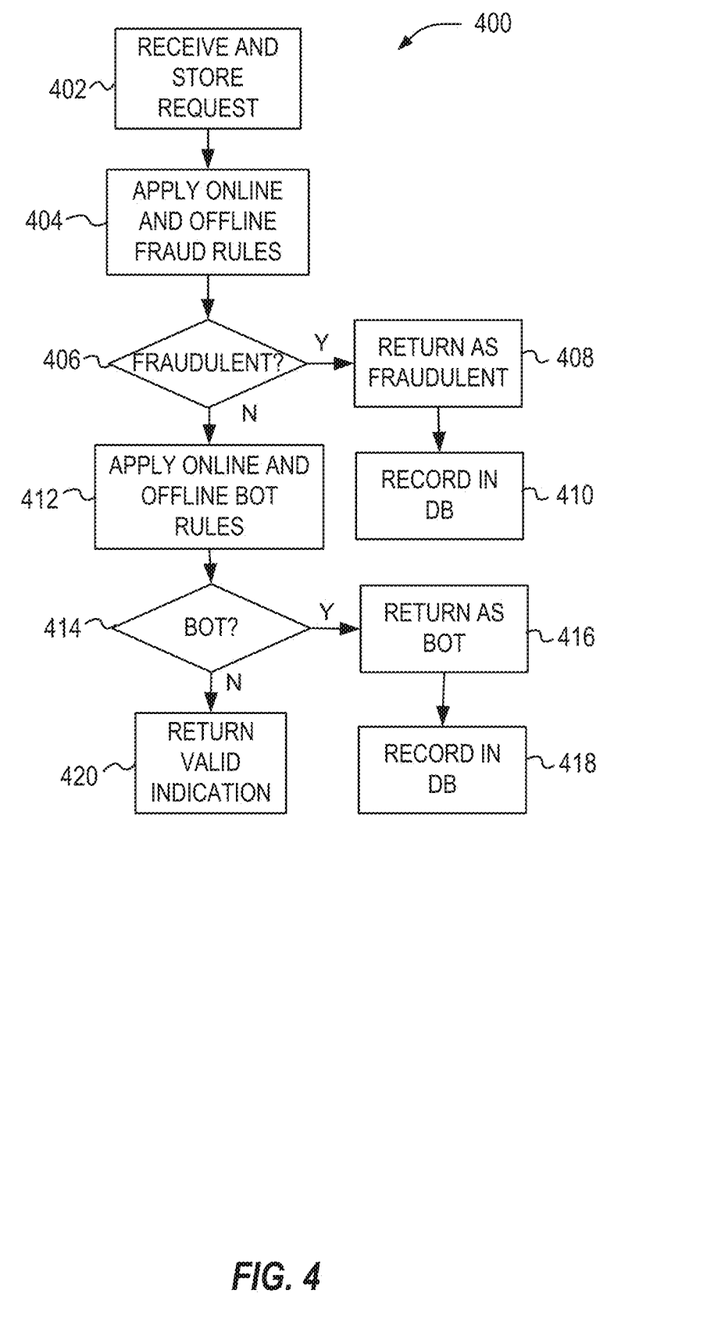
FIG. 4 is a flow-chart diagram of an example third-party portion of the API.

FIG. 4 is a flowchart diagram of a program 400 which is the third-party portion of the API. As described above, the program 400 may be executed on a third-party server separate from the user system 200 and the server endpoint 252. Alternatively, the program 400 may be part of an APP maintained by the third-party and downloaded to the user system 200. At step 402, the program receives and stores the request provided by the user system, for example, at block 304 of the program 300 described above with reference to FIG. 3. At step 404 the program 400 applies the online and off-line fraud rules using the bot/fraud filter 210. When block 406 flags the request as fraudulent, block 408 returns an invalid result indicating a fraudulent request to block 306 of the program 300 running on the user system. After block 408, the program 400 records the fraudulent transaction into one or more databases. The database may be a database used by the off-line new bot/fraud ID system 260 which adds information on the transaction to existing rules/heuristics maintained by the third-party. Alternatively or in addition, the database may be a training set to be used by a neural network or rules generator of the online bot/fraud ID system 206.

When block 406 does not identify the request as fraudulent, program 400, at block 412, applies the request to the online and off-line bot filter 210 to determine whether the request may have originated from a bot. When, at block 414, the program determines that the request is likely from a bot, block 416 returns an invalid result indicating a bot request. At block 418 the program 400 records the bot request into one or more databases used by the new bot/fraud ID system 260 and/or the online bot/fraud ID system 206. When block 414 does not identify a bot, block 420 returns a valid indication to block 306 of the program 300 running on the user system 200.

Figure 5:
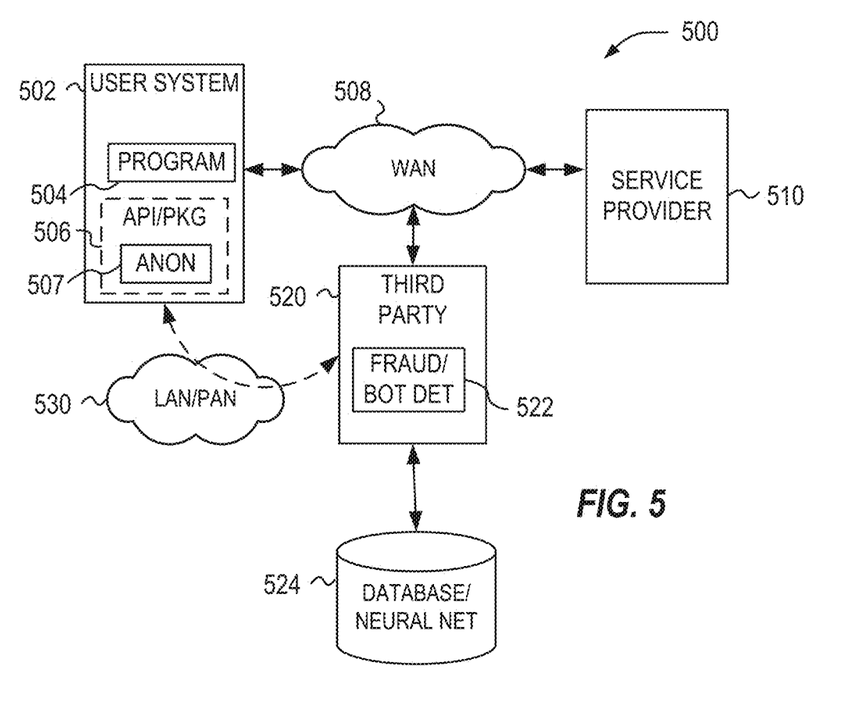
FIGS. 5 and 6 are block diagrams of example implementations.

FIG. 5 is a block diagram of an example configuration which illustrates the partitioning and allocation of the components of the API. FIG. 5 shows three interacting systems:

a user system 502, a service provider 510, and a third-party system 520. In the embodiment shown in FIG. 5, the user system 502 includes a program 504, such as an Internet browser, that generates the request for the service from the service provider 510. Typically, this request would be sent to the service provider via, a wide area network (WAN) 508 (e.g. the Internet) with the PII inserted into the request by the program 504. In this embodiment, however, the request for the service may first be routed through the API/software package 506 to the third-party server 520. This routing may occur via an interaction between the program 504 and the API/software package 506 provided by the service provider 510.

As described above, the service provider may contract with the third-party to provide the types of security checking that are currently performed by the service provider. As a part of the relationship between the service provider and a third-party, the service provider 510 may install the fraud/bot detection software 522 on the service provider system and provide a link to the service provider system as a part of the API/software package used by the program 504 to gain access to the service provided by the service provider 510.

The API 506 may send the request to the third-party system 520 using the information provided by the service provider 510 in the API/software package 506. This information may, for example, include an IP address or other network address for the fraud/bot detection program 522 running on the third-party system 520. The user system running the API may access the fraud/bot detection program 522 through the WAN 508 or through a local area network/personal area network (LAN/PAN) 530.

The fraud/bot detection program 522 may access one or more databases or neural networks 524 to perform the security checks requested by the service provider 510. When the fraud/bot detection program 522 running on the third party system 520 determines that the request is valid, the program 522 notifies the API/software package 506 running on the user system 502. In response to this notification, the API/software package 506 anonymizes the request using the anonymizer 507 and sends the anonymized request to the service provider via the WAN 508. The service provider 510 then processes the request and returns the response to the user system via the WAN 508.

Figure 6:
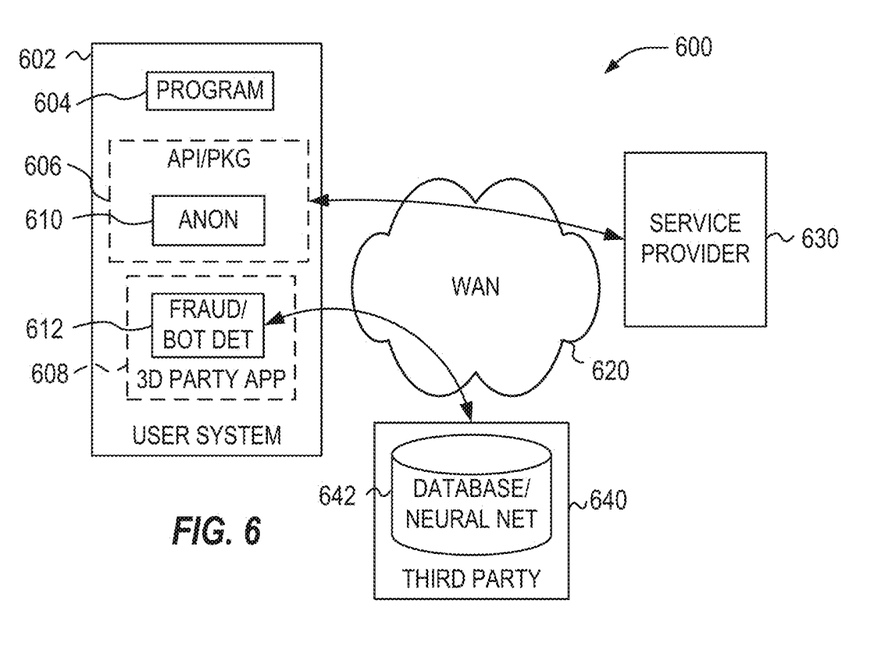

FIG. 6 shows an alternative embodiment in which the fraud/bot detection program runs in an APP 608 that is provided and maintained by the third-party and that runs on the user system. In FIG. 6, a user system 602 request a service from a service provider 630 via a WAN 620. The APP 605 may communicate with a third-party server 640 to exchange data with a database/neural network/rules engine 642 that is used to validate the request for the service. The system shown in FIG. 6 operates in the same way as the system shown in FIG. 5 except that the fraud/bot detection system 612 is not located on the third-party server 640 but, instead, is part of the APP 608. As shown in FIG. 6, the anonymizer 610 is part of the API/software package 606 and is separate from the third-party APP 608.

Figure 7:
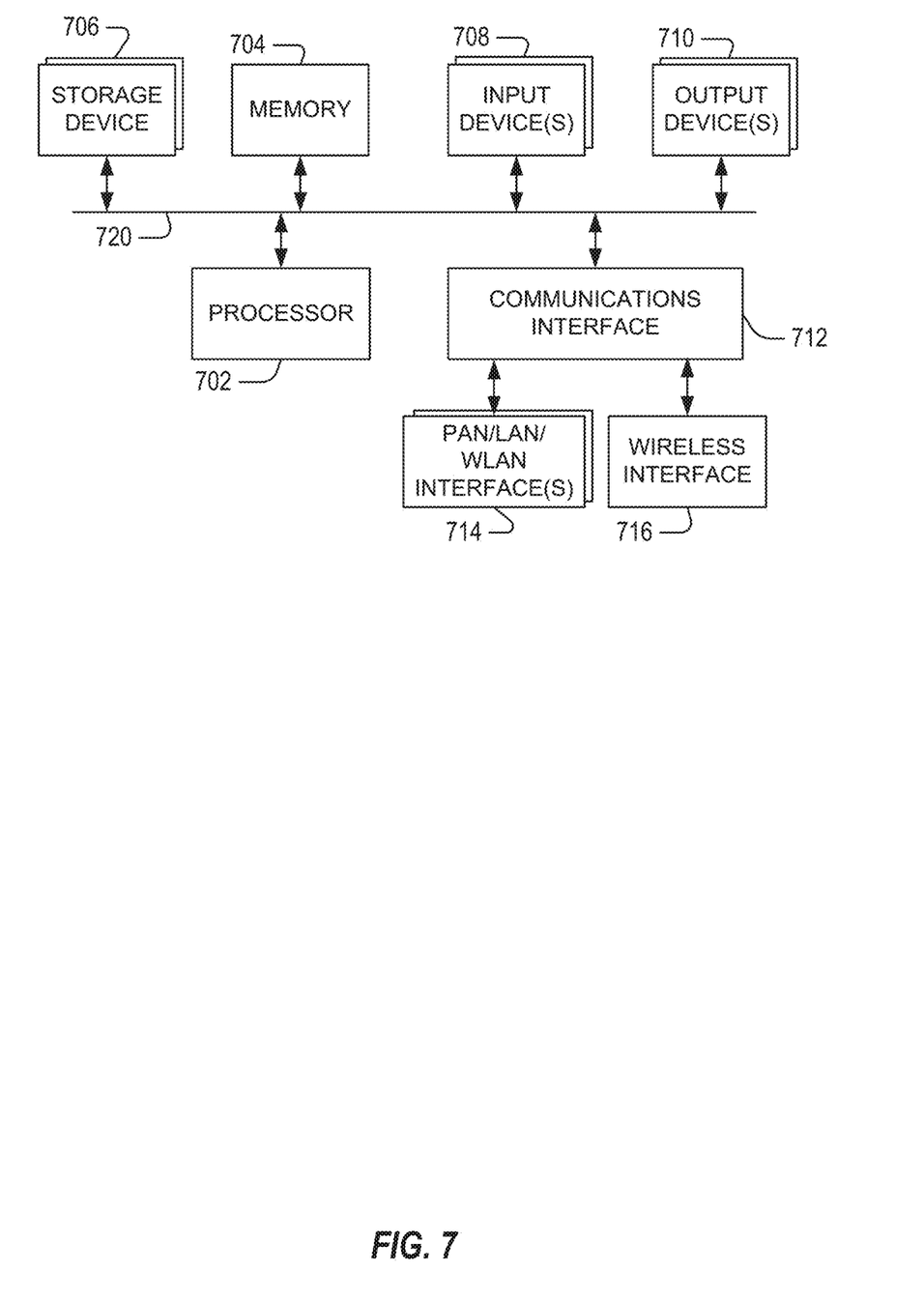
FIG. 7 is a block diagram of example hardware that may be used in an embodiment.

FIG. 7 is a block diagram of an example processing system 700 that may be used as any of the user system, service provider system, and/or third-party system. The system 700 includes a processor 702 coupled to a bus 720. Also coupled to the bus 720 are a storage device 706 (e.g. a flash memory device); a memory 704, which may include random access memory (RAM) and read only memory (ROM); one or more input devices 708 (e.g. a keyboard, a touchscreen, a microphone etc); one or more output devices 710 (e.g. a display screen, a speaker etc.) and a communications interface 712 to provide communication between the system 700 and other systems as described above with reference to FIGS. 5 and 6. As shown in FIG. 7 the communications interface may be coupled to a PAN/LAN/wireless LAN (WLAN) interface such as a wired or optical Ethernet connection and/or a wireless connection (e.g. IEEE 802.11, IEEE 802.15, etc.). In addition the communications interface 712 may be coupled to a wireless interface such as a 3GPP mobile device interface. The interfaces 714 and 716 may be coupled to respective transceivers and/or modems (not shown) to implement the data communications operations.

Processor 702 may include a microprocessor, microcontroller, digital signal processor (DSP) that is configured to execute commands stored in the memory 704 corresponding to the programs (Internet browsers, APIs, DLLs, APPs, etc.) described above. The memory 704 may also store temporary variables or other information used in the execution of these programs. The programs stored in the memory 704 may be retrieved by the processor from a non-transitory machine-readable memory, for example, the storage device 706, or from other non-transitory media such as a CD-ROM, digital versatile disk (DVD), etc.

The described embodiments separate the anonymizer from the third-party system to further increase the user's privacy. As described above, although the PII may be provided to the third-party, the PII is hashed before it is stored by the third-party. The embodiments described above are advantageous to both the service provider and to the user as the service provider no longer needs to validate the request for the service and the user does not need to provide PII to the service provider.

Example 1

In one example, a method implemented in a computing device for securely obtaining services, the method includes: receiving a request for a service, the request including personally identifiable information (PII); sending the request for the service to a third party provider; receiving a response from the third party provider, the response including an indication that the request for the service is authorized; generating anonymized information corresponding to the PII; and modifying the request for the service by replacing the PII in the request for the service with the anonymized information and sending the modified request for the service to a service provider.

In another example, the indication that the request for the service is authorized includes an indication that the request has not been identified as originating from an automated agent (bot) and has not been identified as a fraudulent request for service.

In another example, the PII includes an internet protocol (IP) address and a user agent (UA) string, and the generating of the anonymized information corresponding to the PII in the first example includes setting at least one field in the IP address to zero and deleting part the UA string.

In yet another example, the PII further includes at least one of a machine unique identifier (MUID), a session identifier (ID), and Internet cookies, and the generating of the anonymized information in the first example includes deleting the at least one of the MUID, the session ID, or the Internet cookies.

In another example, sending of the request for the service to the third party provider in the first example includes sending the request for the service to a web application.

In yet another example, the sending the request for the service to the third party provider in the first example includes sending the request for the service to an application program configured to be executed on the computing device.

In another example, the method further includes comparing, by the application program, the request for the service to known fraudulent requests and requests from known automated agents (bots); comparing, by the application program, one of a machine unique identifier (MUID) and an Internet protocol (IP) address to a blacklist of known fraudulent or bot MUIDs and IP addresses; and generating the response indicating that the request for the service is authorized when the request for the service does not match either a known bot request or a known fraudulent request and when neither the MUID nor the IP address is in the blacklist.

In another example, the method further includes analyzing, by the application program, the request for the service as a part of a sequence of requests to identify bot and fraudulent requests.

In yet another example, the method further includes: applying, by the application program, a hash function to the PII to generate hashed PII; modifying, by the application program, the request for the servicer by replacing the PII in the request for the service with the hashed PII; and sending, by the application program, the modified request for the service to an offline bot and fraud detection system.

Example 2

In one example, an apparatus for securely obtaining services includes: a memory; and a processor, coupled to the memory and configured to: receive, via a request to an application program interface (API), a request for a service, the request for the service including personally identifiable information (PII); send the request for the service to a third party provider by invoking a software package in the API; receive a response from the third party provider including an indication that the request for the service is authorized; modify the PII to generate anonymized PII in response to receiving the response indicating that the request for the service is authorized; and send the request for the service using the anonymized information to a service provider via the API.

In another example, the indication that the request for the service is authorized includes an indication that the request for the service has not been identified as originating from an automated agent (bot) and has not been identified as a fraudulent request for service.

In yet another example, the PII includes an internet protocol (IP) address and a user agent (UA) string, and the processor is configured to modify the PII by setting at least one field of the IP address to zero and deleting part of the UA string.

In another example, the PII further includes at least one of a machine unique identifier (MUID), a session identifier (ID), and Internet cookies, and the processor is configured to modify the PII by deleting the at least one of the MUID, the session ID, or the Internet cookies.

In another example, the apparatus further includes an application program that causes the processor to: receive the request for the service as the third party provider; compare the request for the service to known web robot (bot) and fraudulent requests; compare one of a machine unique identifier (MUID) and an Internet protocol (IP) address to a blacklist of known fraudulent or bot MUIDs and IP addresses; and generate the response indicating that the request for the service is authorized when the request for the service does not match a known bot or fraudulent request and when the MUID and the IP address and not in the blacklist.

Example 3

In one example, a third-party service provider includes: a memory; and a processor, coupled to the memory and configured to: receive a request for a service, including personally identifiable information (PII) from a user system; compare the request for the service to known bot and fraudulent requests; compare one of a machine unique identifier (MUID) and an Internet protocol (IP) address in the PII to a blacklist of known fraudulent or bot MUIDs and IP addresses; generate a response to the user system indicating that the request for the service is authorized when the request for the service does not match a known bot or fraudulent request and when the MUID and the IP address are not in the blacklist; apply a hash function to the PII to generate a hashed PII; modify the request for the service by replacing the PII in the request for the service with the hashed PII; and send the modified request for the service to an offline bot and fraud detection system.

In another example, the processor is configured by a software package stored in the memory, the software package being associated with an application program interface (API) running on the user system.

In yet another example, the processor is further configured to apply data extracted from the request for the service to a neural network to determine whether the request is a bot request or a fraudulent request.

Example 4

One example a service provider system includes: a memory; and a processor coupled to the memory, the processor being configured to: generate first and second software packages for an application program interface (API) wherein: the first software package includes a user identification (ID) and network protection component; and the second software package includes an anonymizer component and is configured to exchange data with the first software package; send the first software package to a third-party system; and send the second software package to a user system, separate from the third-party system.

In another example, the first software package includes an application program configured to be executed by the user system and to communicate with the third-party system; and the second software package is configured to exchange data with the application program.

In yet another example, the first software package further includes a bot and fraud detection system including a database configured to run on the third-party system to provide information to the first software package indicating known bot and fraudulent requests for service.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method implemented in a computing device for securely obtaining services from a service provider separate from the computing device, the method comprising:
   receiving, at an application programming interface (API) on the computing device, a request for a service the request originating from an application executing on the computing device, the request including personally identifiable information (PII) of a requester;
   sending, by the API, the request for the service to a third party provider system separate from the computing device and the service provider;
   receiving, by the API, a response from the third party provider system, the response including an authorization result indicating indication that the request for the service is authorized;
   generating, by the API, anonymized information corresponding to the PII;
   modifying, by the API, the request for the service by replacing the PII in the request for the service with the anonymized information; and
   providing the modified request for the service and the authorization result to the application for transmission to the service provider.

2. The method of claim 1, wherein the authorization result includes an indication that the request has not been identified as originating from an automated agent (bot) and has not been identified as a fraudulent request for service.

3. The method of claim 1, wherein the PII includes an internet protocol (IP) address and a user agent (UA) string, and wherein generating the anonymized information corresponding to the PII includes setting at least one field in the IP address to zero and deleting part of the UA string.

4. The method of claim 3, wherein the PII further includes at least one of a machine unique identifier (MUID), a session identifier (ID), and Internet cookies, and wherein generating the anonymized information includes deleting the at least one of the MUID, the session ID, or the Internet cookies.

5. The method of claim 1, wherein sending the request for the service to the third party provider system includes sending the request for the service to a web application.

6. The method of claim 1, wherein sending the request for the service to the third party provider system includes sending the request for the service to an application program provided by the third party and configured to be executed on the computing device.

7. The method of claim 6, further comprising:
   comparing, by the application program, the request for the service to known fraudulent requests and requests from known automated agents (bots);
   comparing, by the application program, one of a machine unique identifier (MUID) and an Internet protocol (IP) address to a blacklist of known fraudulent or bot MUIDs and IP addresses; and
   generating the response indicating that the request for the service is authorized when the request for the service does not match either a known bot request or a known fraudulent request and when neither the MUID nor the IP address is in the blacklist.

8. The method of claim 6, further comprising, analyzing, by the application program, the request for the service as a part of a sequence of requests to identify bot and fraudulent requests.

9. The method of claim 6, further comprising:
   applying, by the application program, a hash function to the PII to generate hashed PII;
   modifying, by the application program, the request for the servicer by replacing the PII in the request for the service with the hashed PII; and
   sending, by the application program, the modified request for the service to an offline bot and fraud detection system.

10. An apparatus for securely obtaining services comprising:
    a memory; and
    a processor, coupled to the memory and configured to:

receive, from an application executing on the apparatus, via a request to an application program interface (API) provided on the apparatus, a request for a service from a service provider separate from the apparatus, the request for the service including personally identifiable information (PII);

send the request for the service to a third party provider system by invoking a software package in the API;

receive, by the software package in the API, a response from the third party provider system including an authorization result indicating that the request for the service is authorized;

modify, by the software package in the API, the PII to generate anonymized PII in response to receiving the authorization result;

modify, by the software package in the API, the request for service by replacing the PII in the request for service with the anonymized PII; and provide, by the API, the modified request for the service and the authorization result to the application for transmission to the service provider.

11. The apparatus of claim 10, wherein the authorization result includes an indication that the request for the service has not been identified as originating from an automated agent (bot) and has not been identified as a fraudulent request for service.

12. The apparatus of claim 10, wherein the PII includes an internet protocol (IP) address and a user agent (UA) string, and wherein the processor is configured to modify the PII by setting at least one field of the IP address to zero and deleting part of the UA string.

13. The apparatus of claim 12, wherein the PII further includes at least one of a machine unique identifier (MUID), a session identifier (ID), and Internet cookies, and wherein the processor is configured to modify the PII by deleting the at least one of the MUID, the session ID, or the Internet cookies.

14. The apparatus of claim 10, further comprising an application program that causes the processor to:
  receive the request for the service as the third party provider system;
  compare the request for the service to known web robot (bot) and fraudulent requests;
  compare one of a machine unique identifier (MUID) and an Internet protocol (IP) address to a blacklist of known fraudulent or bot MUIDs and IP addresses; and
  generate the response indicating that the request for the service is authorized when the request for the service does not match a known bot or fraudulent request and when the MUID and the IP address and not in the blacklist.

* * * * *